(12) United States Patent
Beckerman et al.

(10) Patent No.: US 8,732,015 B1
(45) Date of Patent: May 20, 2014

(54) SOCIAL MEDIA PRICING ENGINE (71) Applicant: Unified Social, Inc., New York, NY (US)

(72) Inventors: Jason Beckerman, Brooklyn, NY (US); Adrian Medina, New York, NY (US); Dylan Friedmann, Brooklyn, NY (US)

(73) Assignee: Unified Social, Inc., New York, NY (US)

( * ) Notice: Subject to any disclaimer, the term of this patent is extended or adjusted under 35 U.S.C. 154(b) by 0 days.

(21) Appl. No.: 13/906,145

(22) Filed: May 30, 2013

(51) Int. Cl.
G06Q 30/00 (2012.01)
G06Q 30/02 (2012.01)

(52) U.S. Cl.
CPC .................................. *G06Q 30/0247* (2013.01)
USPC ...................................................... 705/14.46

(58) Field of Classification Search
CPC ................................................. G06Q 30/0247
USPC ....................................................... 705/14.46
See application file for complete search history.

(56) References Cited

U.S. PATENT DOCUMENTS

| | | | |
|---|---|---|---|
| 2008/0091517 A1* | 4/2008 | Koonce et al. .................. | 705/10 |
| 2009/0307056 A1* | 12/2009 | Park et al. ....................... | 705/10 |
| 2010/0332288 A1* | 12/2010 | Higgins et al. .................. | 705/10 |
| 2011/0040611 A1* | 2/2011 | Simmons et al. ........... | 705/14.41 |
| 2011/0106630 A1* | 5/2011 | Hegeman et al. ........... | 705/14.71 |
| 2011/0225174 A1* | 9/2011 | Artzt et al. ...................... | 707/750 |
| 2012/0166292 A1* | 6/2012 | Bax et al. .................... | 705/14.71 |
| 2012/0209795 A1* | 8/2012 | Glickman ....................... | 706/12 |
| 2012/0254152 A1* | 10/2012 | Park et al. ..................... | 707/710 |
| 2012/0310728 A1* | 12/2012 | Kagan ......................... | 705/14.43 |
| 2013/0066711 A1* | 3/2013 | Liyanage et al. .......... | 705/14.43 |
| 2013/0066714 A1* | 3/2013 | Umeda ....................... | 705/14.46 |
| 2013/0110641 A1* | 5/2013 | Ormont et al. ............. | 705/14.66 |
| 2013/0197996 A1* | 8/2013 | Dunham et al. ........... | 705/14.48 |
| 2014/0025496 A1* | 1/2014 | Davitz et al. ............... | 705/14.54 |

* cited by examiner

*Primary Examiner* — James W Myhre
*Assistant Examiner* — David Stoltenberg
(74) *Attorney, Agent, or Firm* — Morrison & Foerster LLP (57) ABSTRACT

Processes for determining predicted prices of social media actions from disparate social media types are disclosed. In one example process, campaign attribute data associated with an advertising campaign on a social media service may be received. The campaign attribute data and historical campaign attribute data associated with previously performed advertising campaigns may be used to generate a plurality of predicted prices for the social media action. A weighted sum of the plurality of predicted prices may be calculated to generate a final predicted price for the social media action. Predicted prices for other social media actions performed on other social media services may similarly be generated. Systems and non-transitory computer-readable storage media for performing these processes are also provided.

17 Claims, 6 Drawing Sheets

FIG. 1

Interface
200

SOCIAL MEDIA PRICING ENGINE

BACKGROUND

1. Field

The present application relates generally to social media and, more specifically, to analyzing advertising campaigns on various social media types.

2. Related Art

Due to the increasing popularity of social media, companies have directed their marketing efforts toward various social media services, such as Facebook™, Twitter™, Linkedin™, YouTube™, Pinterest™, and the like. Typically, advertising agencies are hired to run advertising campaigns for one or more of these services. For example, the advertising agency may run an advertising campaign on Twitter™ involving the creation of a corporate Twitter account that can be used by a company to "Tweet" about product updates, special offers, etc. The advertising agency may charge the company based on the number of followers, "re-Tweets," or the like, generated by the corporate account. In another example, the advertising agency may run an advertising campaign on Facebook™ involving the creation of a corporate Facebook™ account/page to post company information, pictures, messages, updates, etc. The advertising agency may charge the company based on the number of friends, "likes," comments, shares, or the like, generated by the corporate account.

While the number of social media actions (e.g., "likes," comments, "Tweets," etc.) directly generated by the advertising campaign on each social media service can easily be tracked, it is difficult to compare the performance of advertising campaigns from disparate social media services. For example, it is difficult to compare the value of a Facebook™ campaign, which may include friends, "likes," comments, shares, etc., with a Twitter™ campaign, which may include "Tweets," "re-Tweets," follows, and the like.

SUMMARY

Computer-implemented methods for determining a price per action in a social media service are provided. One example method may include receiving, at a pricing server, campaign attribute data associated with a first advertising campaign on a first social media service; generating a first plurality of price predictions for a first social media action of the first social media service based on the campaign attribute data associated with the first advertising campaign and historical campaign data associated with a plurality of historical advertising campaigns; generating a first final price prediction for the first social media action based on the first plurality of price predictions; and transmitting, by the pricing server, the first final price prediction.

In one example, the method may further include receiving, by the pricing server, the historical campaign data associated with the plurality of historical advertising campaigns, wherein the historical campaign data comprises a plurality of price per actions and a plurality of sets of campaign attribute data associated with the plurality of historical advertising campaigns.

In one example, the method may further include performing a first set of mathematical transformations on the campaign attribute data associated with the first advertising campaign; and performing a second set of mathematical transformations on the historical campaign data associated with the plurality of historical advertising campaigns.

In one example, generating the first plurality of price predictions for the first social media action of the first social media service may include: generating a first price prediction for the first social media action by identifying a first matching historical advertising campaign of the plurality of historical advertising campaigns using a k-Nearest Neighbor algorithm; generating a second price prediction for the first social media action by identifying a second matching historical advertising campaign of the plurality of historical advertising campaigns using a Random Forest algorithm; and generating a third price prediction for the first social media action by: identifying a linear relationship between an attribute of the historical advertising campaigns and a price of the first social media action using a Multivariate Adaptive Regression Splines algorithm; and determining the third price prediction based on a value of the attribute of the first advertising campaign and the identified linear relationship.

In one example, the first price prediction may include a price of a social media action in the first matching historical advertising campaign; the second price prediction may include a price of a social media action in the second matching historical advertising campaign; and the third price prediction may include a price calculated from the identified linear relationship and the value of the attribute of the first advertising campaign.

In one example, generating the first final price prediction for the first social media action based on the first plurality of price predictions may include: assigning a first weight to the first price prediction; assigning a second weight to the second price prediction; assigning a third weight to the third price prediction; and generating the final price prediction by calculating a weighted sum of the first plurality of price predictions using the first weight, the first price prediction, the second weight, the second price prediction, the third weight, and the third price prediction. In another example, the first weight, the second weight, and the third weight may be generated using a root-mean square error algorithm.

In one example, the campaign attribute data associated with the first advertising campaign may be received from a user requesting the first final predicted price, the first social media service, or a third party aggregator of advertising data.

In one example, the method may further include: receiving, at the pricing server, campaign attribute data associated with a second advertising campaign on a second social media service, wherein the first social media service and the second social media service are different; generating a second plurality of price predictions for a second social media action of the second social media service, wherein the first social media action and the second social media action are different; generating a second final price prediction for the second social media action based on the second plurality of price predictions; and transmitting, by the pricing server, the second final price prediction.

Systems and non-transitory computer-readable storage media for determining a price per action in a social media service are also provided.

DETAILED DESCRIPTION

The following description sets forth numerous specific configurations, parameters, and the like. It should be recognized, however, that such description is not intended as a limitation on the scope of the present technology, but is instead provided as a description of exemplary embodiments.

The present disclosure relates to processes for determining predicted prices of social media actions from disparate social media types. In one example process, campaign attribute data associated with an advertising campaign on a social media service may be received. The campaign attribute data and historical campaign attribute data associated with previously performed advertising campaigns may be used to generate a plurality of predicted prices for the social media action. A weighted sum of the plurality of predicted prices may be calculated to generate a final predicted price for the social media action. Predicted prices for other social media actions performed on other social media services may similarly be generated. Systems for performing these processes are also provided.

1. Pricing System Architecture

Figure 1:
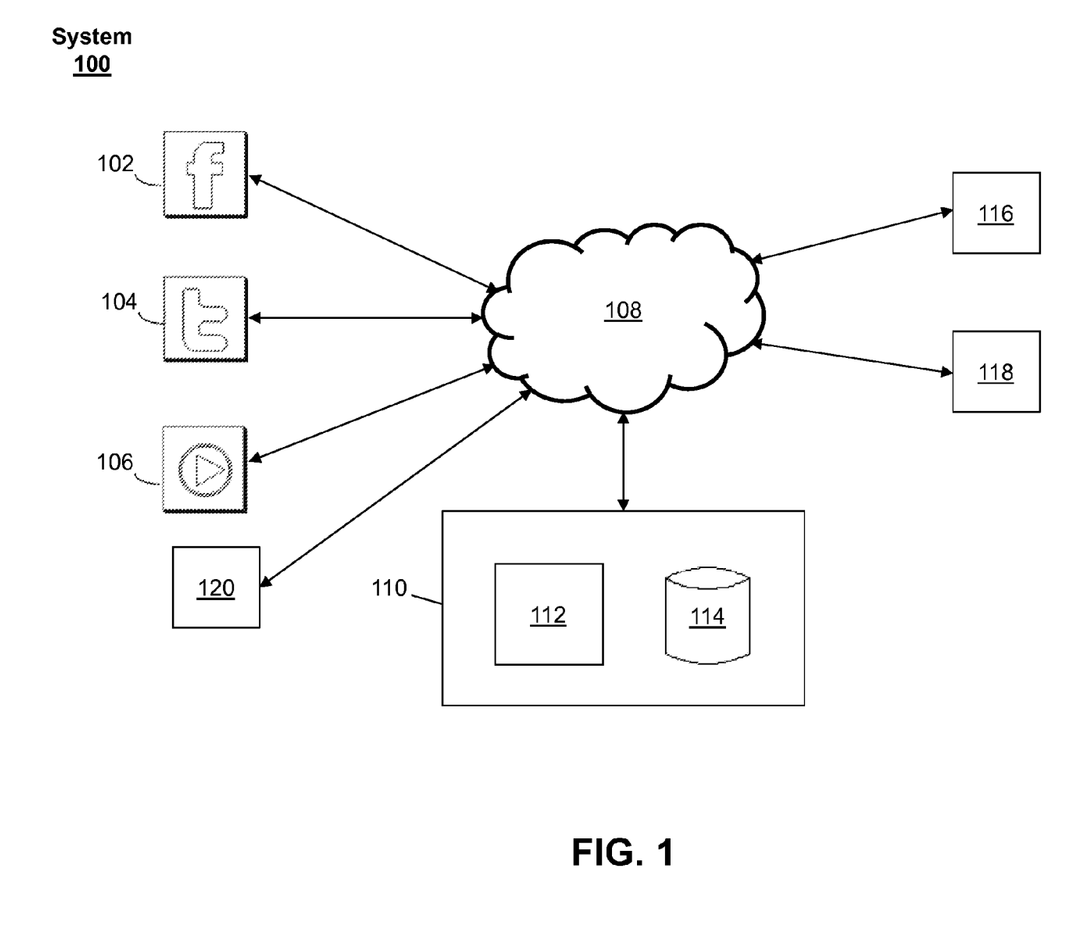
FIG. 1 depicts a system diagram of an exemplary social media pricing system.

FIG. 1 illustrates an exemplary social media pricing system 100. System 100 may include social media providers 102, 104, and 106 coupled to network 108, which may include the Internet, an intranet, or other public or private networks. Social media providers 102, 104, and 106 may include any provider of various social media types, such as Facebook™, Twitter™, Linkedin™, YouTube™, Pinterest™, and the like. Each social media provider 102, 104, or 106 may include one or more servers for providing social media services to users 116 and 118 via network 108. While three social media providers and two users are shown in FIG. 1, it should be appreciated that system 100 may include any number of social media providers and any number of users.

System 100 may further include pricing server 110 for analyzing advertising campaign data associated with social media providers 102, 104, and 106. Pricing server 110 may be coupled to network 108 and may receive campaign data from social media providers 102, 104, and 106 via network 108. Pricing server 110 may additionally or alternatively receive campaign data from a third party aggregator of campaign data 120. Third party 120 may similarly include one or more servers for providing campaign data associated with one or more social media providers 102, 104, or 106, or other social media providers to pricing server 110. The campaign data may be transferred from social media providers 102, 104, and 106 or third party 120 to pricing server 110 using any known protocol, such as via API calls, CSV/XLS import, and the like.

The campaign data provided to pricing server 110 by social media providers 102, 104, and 106 and third party 120 may include data associated with one or more advertising campaigns performed on social media providers 102, 104, and 106. In some examples, the campaign data may generally include campaign pricing data (e.g., a price of the advertising campaign and/or price per social media action) and campaign attribute data that characterize the advertising campaigns performed on social media providers 102, 104, and 106. In some examples, the campaign attribute data may include the following attributes of a brand's advertising campaign: 1) a "vertical" variable in the form of a text description of a brand's market sphere (e.g., "food and beverage," "consumer electronics," "retail," etc.), 2) a "market size" variable in the form of a text description of the brand's exposure level (e.g., "local/regional," "national," etc.), 3) a "within market" variable in the form of a Boolean value indicating whether or not a brand's advertising campaign matches its market size, 4) a "duration" variable in the form of an integer value indicating the length of the campaign (e.g., in days), 5) a "spend per day" variable in the form of a numerical value representing the budget allocated per day for the advertising campaign, 6) a "total age range" variable in the form of a numerical value representing the total age range of a target audience (e.g., difference between upper and lower age of the range), 7) a "gender" variable in the form of a text description of the gender of the target audience (e.g., "male," "female," or "both"), 8) a "geographic limitations" variable in the form of a Boolean value indicating whether or not there is a geographical identifier for localized targeting of the campaign, 9) a "goal" variable in the form of a text description of a contracted social media action to be acquired (e.g., clicks, likes, video views, impressions, etc.), 10) a "method" variable in the form of a text description of the ad placement or other strategy employed to acquire target social media actions (e.g., "sponsored stories," "wall posts," etc.), 11) a "reach" variable in the form of a numerical reach value representing an estimate of audience exposure based on one or more of variable numbers 1-10, and 12) a "total fans" variable in the form of a numerical value representing the number of fans of the brand at the start of the advertising campaign (e.g., fans, followers, likes, etc.). While specific examples of campaign attribute data are provided above, it should be appreciated that other types of campaign attribute data may also be provided to pricing server 110 for use in analyzing advertising campaigns.

Figure 2:
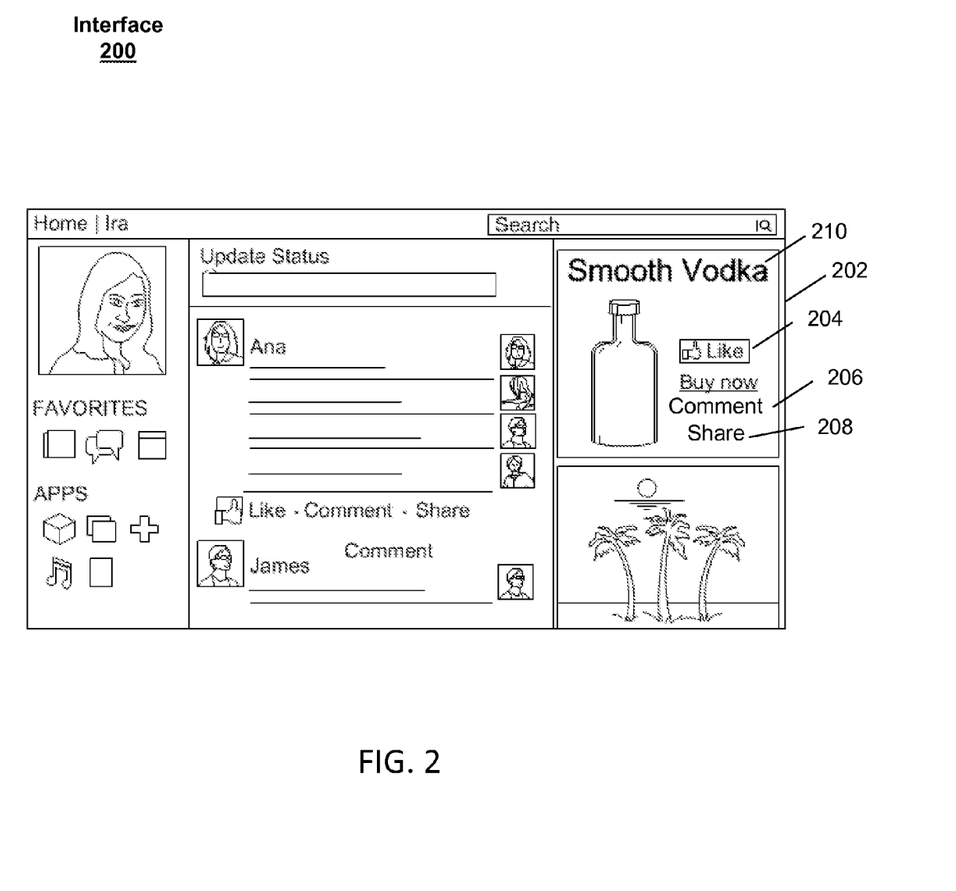
FIG. 2 depicts an exemplary social media interface providing options to perform various social media actions.
Figure 3:
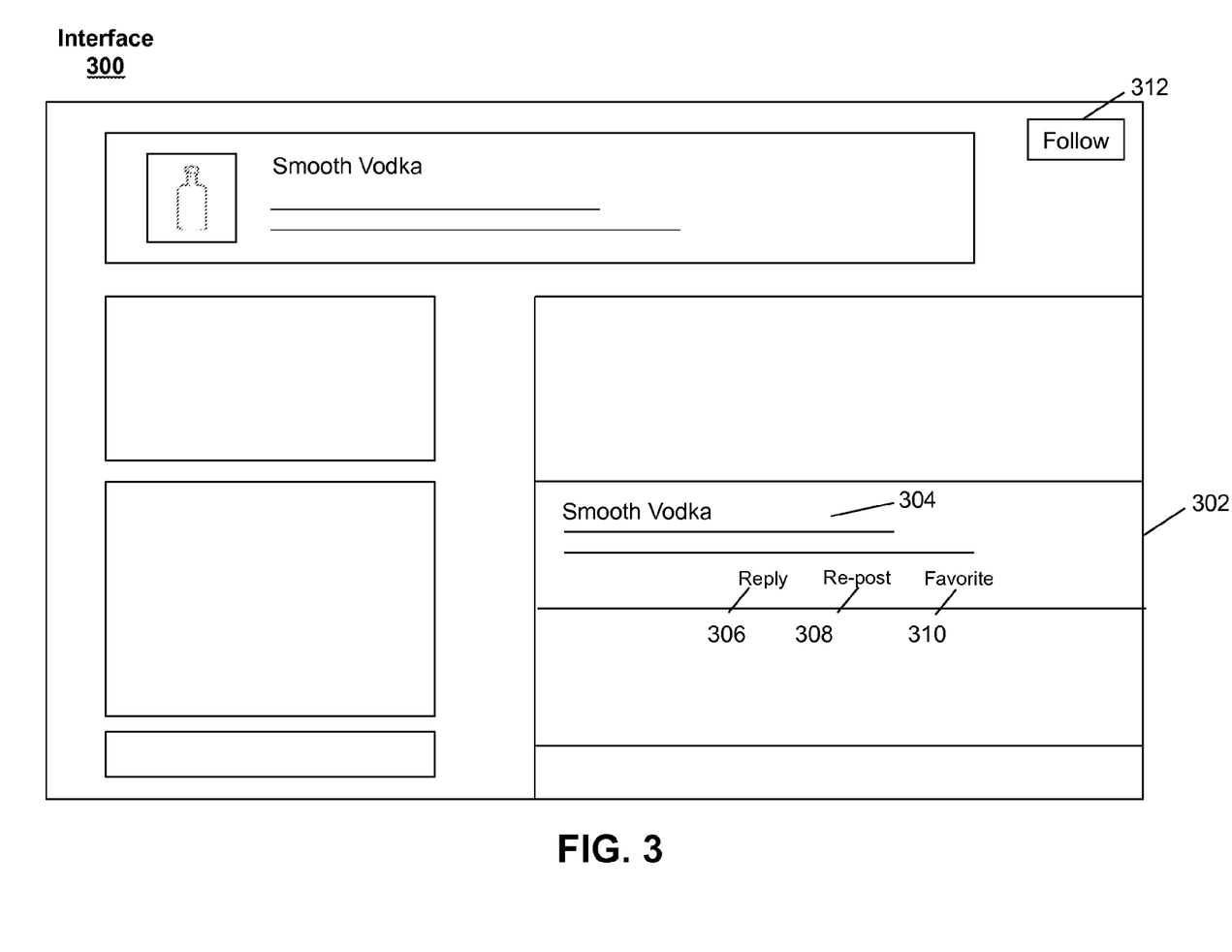
FIG. 3 depicts another exemplary social media interface providing options to perform various social media actions.

"Social media actions" may represent the types of actions that can be performed on each social media provider in association with a brand's social media account or advertisement that may be paid for by the brand. For example, as shown in interface 200 of FIG. 2, an advertisement on an Internet-based social networking website may include the display of an advertisement 202 in a user's newsfeed. Social media actions associated with such an advertisement may include clicking "like" button 204, comment button 206, share button 208, a hyperlink 210, and the like. In contrast, an advertisement on another Internet-based social networking website, as shown in interface 300 FIG. 3, may include a message 302 containing a description 304 of a new product or service. In this example, social media actions associated with such an advertisement may include replying to the message by selecting "Reply" button 306, re-post the message by selecting "re-post" button 308, designating the message as a favorite by selecting "Favorite" button 310, following the account posting the message by selecting "Follow" button 312, and the like.

Since each social media provider 102, 104, or 106 may include the same or different social media actions, the advertising campaign data received from each social media provider 102, 104, and 106 or third party 120 may also be the same or different. For example, the advertising campaign data associated with Facebook™ that is received by pricing server 110 may include the number of "likes," shares, comments, or click-throughs received by an advertising campaign, while the advertising campaign data associated with Twitter™ that is received by pricing server 110 may include the number of "retweets," favorites, and follows received by an advertising campaign. While specific examples are provided above for the Facebook™ and Twitter™ social media providers, it should be appreciated that advertising campaign data associated with other social media providers having other social media actions similarly be received by pricing server 110.

Pricing server 110 may store the advertising campaign data received from social media providers 102, 104, and 106 in pricing database 114. Pricing database 114 may include both current and historical advertising data received from social media providers 102, 104, and 106, third party 120, or another database. Additionally, while pricing database 114 is shown within server 110, it should be appreciated that pricing database 114 may be included within pricing server 110 and/or may be located at a remote location and accessed through network 108.

Pricing server 110 may further include pricing logic 112 for analyzing advertising campaign data stored in pricing database 114. As will be discussed in further detail below, pricing logic 112 may include logic for calculating a price per action for one or more of the social media actions and for analyzing the performance of an advertising campaign across one or more types of social media from one or more social media providers 102, 104, and 106. In some examples, an advertising campaign may include one or more advertisements on one or more types of social media that are associated with a brand (e.g., an individual, a company, or the like).

2. Social Media Action Pricing Logic

Figure 4:
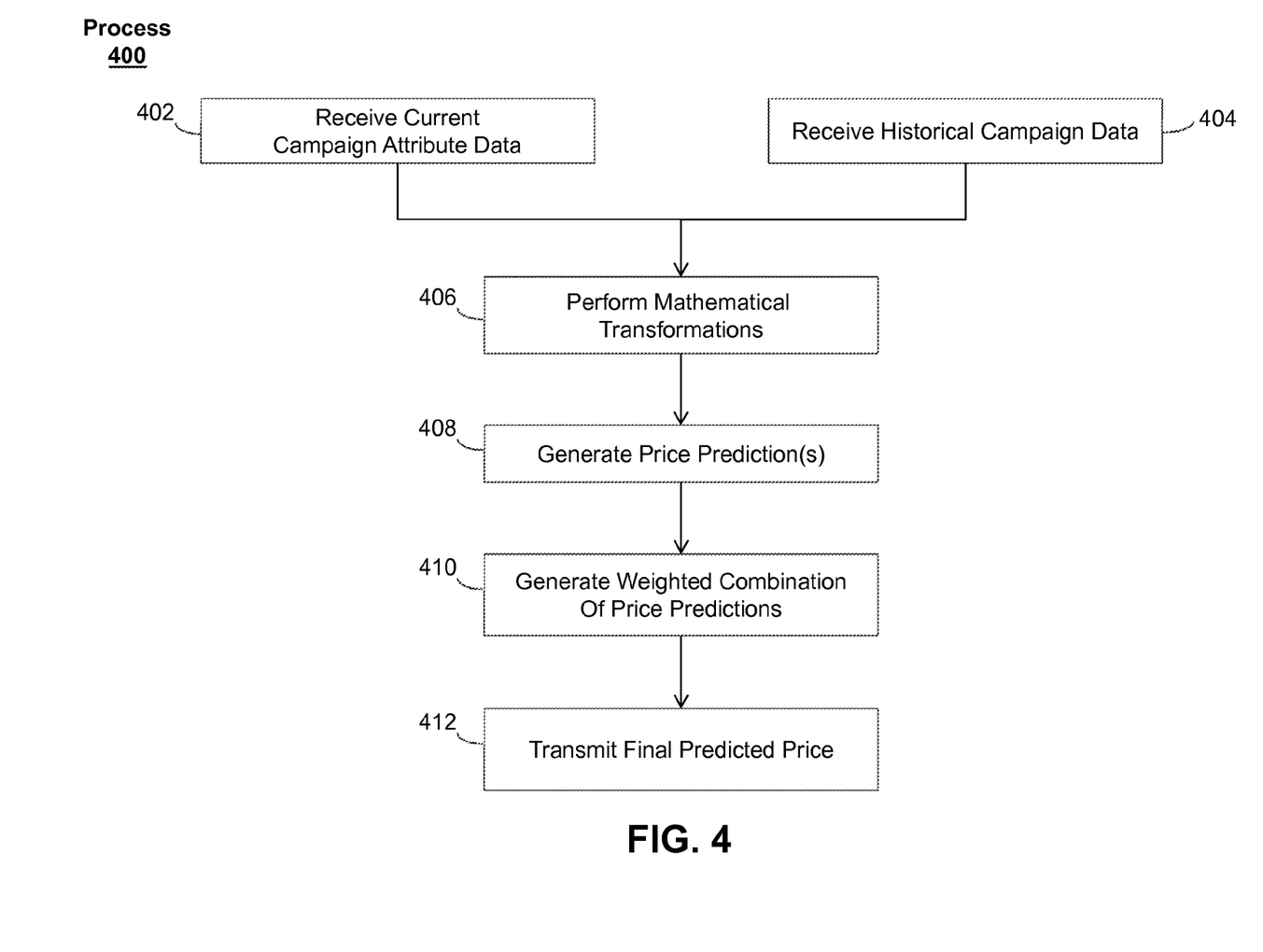
FIG. 4 depicts an exemplary process for predicting a price of a social media action.

FIG. 4 illustrates an exemplary process 400 for calculating a price per social media action that may be performed by pricing server 110 using pricing logic 112. At block 402, a request for a price per action may be received from a user of the pricing service offered by pricing server 110. The request may include user-provided campaign attribute data associated with the current advertising campaign of the social media action. For example, when making a request for a price per action in a particular advertising campaign, a user may provide any of the following attributes of a brand's desired advertising campaign: 1) a "vertical" variable in the form of a text description of a brand's market sphere (e.g., food and beverage, consumer electronics, retail, etc.), 2) a "market size" variable in the form of a text description of the brand's exposure level (e.g., "local/regional," "national," etc.), 3) a "within market" variable in the form of a Boolean value indicating whether or not a brand's advertising campaign matches its market size, 4) a "duration" variable in the form of an integer value indicating the length of the campaign (e.g., in days), 5) a "spend per day" variable in the form of a numerical value representing the budget allocated per day for the advertising campaign, 6) a "total age range" variable in the form of a numerical value representing the total age range of a target audience (e.g., difference between upper and lower age range), 7) a "gender" variable in the form of a text description of the gender of the target audience (e.g., "male," "female," or "both"), 8) a "geographic limitations" variable in the form of a Boolean value indicating whether or not there is a geographical identifier for localized targeting of the campaign, 9) a "goal" variable in the form of a text description of a contacted social media action to be acquired (e.g., clicks, likes, video views, impressions, etc.), 10) a "method" variable in the form of a text description of the ad placement or other strategy employed to acquire target social media actions (e.g., sponsored stories, wall posts, etc.), 11) a "reach" variable in the form of a numerical reach value representing an estimate of audience exposure based on one or more of variable numbers 1-10, and 12) a "total fans" variable in the form of a numerical value representing the number of fans of the brand at the start of the advertising campaign (e.g., fans, followers, likes, etc.). While specific examples of campaign attribute data are provided above, it should be appreciated that other types of campaign attribute data may also be provided to pricing server 110 for use in analyzing advertising campaigns.

In some examples, if one or more of the above-listed attributes are not provided by the user, pricing server 110 may determine the missing attribute based on one or more of the other provided attributes of the campaign. For example, if the "spend per day" is not provided, the "spend per day" value may be determined by dividing the total advertising budget by the "duration" of the campaign in days. Similarly, if the "total age range" is not provided, but the range of target ages is provided, pricing server 110 may determine the "total age range" by subtracting the lower value of the age range from the upper value of the age range.

Additionally or alternatively, the one or more missing attributes of the desired advertising campaign may be received by pricing server 110 from a social media provider, such as social media provider 102, 104, or 106 and/or a third party, such as third party 120. The additional campaign data may include any advertising campaign data that is not received from the user at block 402.

To illustrate, in one example, a representative of an advertisement agency representing brand X may request a price per action by proving advertising campaign data to pricing server 110 using a local or remote computing system. In this example, the provided advertising campaign data may indicate that the "vertical" of brand X may be "Food," the "market size" of brand X may be "National," the "goal" of the advertising campaign may be "Facebook™ Likes," the "method" for obtaining "Facebook™ Likes" may be "Facebook Marketplace Ads," the target audience of the advertising campaign may have a "gender" of "females" between the ages of 25-49 across the United States, the "duration" of the advertising campaign may be 30 days, and a budget of 100,000 dollars. Based on this received data, pricing server 110 may determine that the "within market" variable is "true" since the campaign is targeting within its usual market, the "geographic limitations" variable is false since there are no geographical limitations, the "total age range" is 24 (49-25), and the "spend per day" is roughly 3,333 dollars (100,000/30). Additionally, since pricing server 110 was granted access to brand X's social media account, pricing server 110 may receive, from the Facebook™ server, the number of Facebook™ fans of brand X (e.g., 250,000 Facebook™ fans) at the time of entry of the desired advertising campaign data.

At block 404, historical campaign data may be received by pricing server 110 from social media providers 102, 104, and 106, or third party 120. Pricing server 110 may store the received historical campaign data in pricing database 114. The historical campaign data may include pricing data and associated campaign attribute data of past advertising campaigns performed on social media providers 102, 104, and 106. The types of campaign attribute data may include similar or identical types of data as received for the current advertising campaign at block 402. In some examples, block 404 may not be performed as part of process 400. Instead, pricing server 110 may receive historical campaign data from social media providers 102, 104, and 106, or third party 120 prior to performing process 400 (e.g., received at periodic intervals, as additional historical campaign data becomes available, or at other times or intervals).

At block 406, a mathematical transformation may be applied to the data received at blocks 402 and 404 to transform the data into a form that is readable by statistical models, while maintaining the initial integrity of the originally gathered information. Example transformations that may be used include logarithmic transformations, mean centering transformations, numerical scaling transformations, and other transformations for use with prediction and classification. In some examples in which block 404 is not performed as part of process 400, block 406 may not be performed on the historical campaign data as part of process 400. Instead, block 406 may be performed on the historical campaign data prior to performing process 400 such that the transformed historical data may already be in a form capable of being input into a statistical model for comparison with the current campaign attribute data received at block 402. In these examples, the transformed historical data may be stored in pricing database 114 and may be updated periodically, as additional historical campaign data becomes available, or at any other desired time or interval.

To illustrate, continuing with the example provided above, after the representative of the advertisement agency data provides the campaign attribute data, a mathematical transformation may be performed on the data (and optionally to the historical campaign data received at block 404). For example, if an estimate of "reach" was determined at block 402 by taking 80% of the U.S. population (the total believed to be connected on Facebook™) and reducing that number to include only females aged 25 to 49, the determined "reach" estimate may be 72 million users. Next, a series of logarithmic transformations may be performed. The relationship between the natural log of a number z and the original value is $e^z$, where e is Euler's constant. The 72 million reach estimate becomes 18.1 when transformed in this manner. Similarly, "total fans," "spend per day," "budget," and "duration," may be logarithmically transformed. Additionally, these values may be numerically scaled by taking the initial value, subtracting it from the average value from the historical campaign data, and then dividing by the standard deviation for that variable from the historical campaign data.

At block 408, one or more price predictions may be generated based on the current campaign attribute data received at block 402 and historical campaign data received at block 404 that were mathematically transformed at block 406. One example price prediction may be generated by associating the campaign attribute data of the current advertising campaign received at block 402 with historical campaign data of a similar historical campaign received at block 404 based on a measurement of Euclidian distance using the k-Nearest Neighbor (kNN) algorithm originally discussed in Cover, T. M., Hart, P. E. Nearest Neighbor Pattern Classification, IEEE Trans. Inform. Theory, IT-13(1):21-27, 1967. Generally, this algorithm may use one or more types of campaign attribute data listed above to identify a historical campaign that is most similar based on Euclidian distance and may use a price per action associated with that historical campaign as the predicted price.

A second example price prediction may be generated by constructing a decision tree that breaks down historical campaign prices as falling into several groups that have similar numerical and categorical ranges of campaign attribute data types. The campaign's price that is being predicted then falls into one of these groups based on its own numerical and categorical attributes. The predicted price per action for the current advertising campaign may be assigned based on the group into which it falls and the historical campaign price associated with that group. One example algorithm that may be used to accomplish this is the Random Forest algorithm discussed in Breiman, Leo, Random Forests, Machine Learning, 45, 5-32, 2001.

A third example price prediction may be generated by representing campaign attributes as having a linear relationship to price. An example of a linear relationship may include any campaign attribute that has a tendency to increase/decrease with an increase/decrease in price per action. These relationships may be established based on the historical campaign data and then applied to the current campaign attributes. One algorithm that may be used to determine these relationships is the Multivariate Adaptive Regression Splines (MARS), as discussed in Friedman, J. H., Multivariate Adaptive Regression Splines, Annals of Statistics 19 (1): 1-67, 1991. Using the determined relationship between the campaign attribute and the price per action, a predicted price may be determined by inserting the value of the campaign attribute of the current advertising campaign into the determined relationship.

To illustrate, continuing with the example above, a "Facebook™ Like" in brand X's advertising campaign may be predicted to have a price prediction of $0.85 using the kNN algorithm, a price prediction of $0.70 using the Random Forest algorithm, and a price prediction of $0.67 using the MARS algorithm.

At block 410, a weighted combination of the price predictions produced at block 408 may be generated. In some examples, the weight assigned to each price prediction may be selected by the user or system administrator. In other examples, the weights may be determined by using weights that minimize overall risk. To determine these weights, a root-mean square error (RMSE) algorithm may be used. The result of the RMSE algorithm may be a set of weights $W(1 \ldots n)$ having a value from [0, 1]. The weight assigned to each price prediction by this algorithm may generally indicate the strength of the variable's linear relationship to the variable being predicted (e.g., price). Depending on this strength, the sum of weights W1, W2, and W3 assigned to the first, second, and third price predictions, respectively, may equal any number between [0, 3]. Using these weights, the predicted price may be calculated using the following equation:

Price Prediction=Intercept+(W1*Price Prediction1)+
(W2*Price Prediction2)+(W3*Price Prediction3)

In the above equation, the "Intercept" variable is a real number, "W1" is the weight for the first price prediction value, "Price Prediction1" is the first price prediction value, "W2" is the weight for the second price prediction value, "Price Prediction2" is the second price prediction value, "W3" is the weight for the third price prediction value, and "Price Prediction3" is the third price prediction value.

Additionally, as advertising data for additional advertising campaigns become available, the RMSE algorithm may continue to be used to refine the assigned weights. A final predicted price per action may be generated by multiplying the assigned weights with their respective predicted prices and adding them together. In some examples, a range of predicted prices per action may also be generated that includes a lower bound of a number of (e.g., one) standard deviations below the weighted predicted price and an upper bound of a number of (e.g., one) standard deviations above the weighted predicted price.

To illustrate, continuing with the example above, the predicted price values of $0.85, $0.70, and $0.67 may be weighed in a manner that is optimized for minimal Root Mean Square Error in an unobserved set of historical examples. From this, the final price prediction may be set at $0.65. This value may be further translated into a range within one standard deviation of predictive error in the aforementioned hold-out set. Thus, the final range may be set at between $0.58-0.79.

At block 412, the predicted price generated at block 412 may be provided to the user making the price request. In some examples, the predicted price may include a single value representing the weighted sum of the predicted prices determined at block 410. In other examples, the predicted price may include a range of values centered around the weighted sum of the predicted prices determined at block 410.

To illustrate, continuing with the example above, the determined range of $0.58-0.79 and final price prediction of $0.65 may be returned to the user.

While blocks 402, 404, 406, 408, 410, and 412 are shown in a particular order in FIG. 4, it should be appreciated that these blocks may be performed in any order and some blocks may be performed at the same time or not at all. For instance, in some examples, block 404 may not be performed as part of process 400. Instead, block 404 may be performed prior to performing process 400 at periodic intervals, as additional historical campaign data becomes available, or at other times or intervals. Similarly, in these examples, block 406 may not be performed on the data received at block 404 as part of process 400. Instead, block 406 may be performed on the historical campaign data prior to performing process 400 such that the transformed historical data may already be in a form capable of being input into a statistical model for comparison with the current campaign attribute data received at block 402. In these examples, block 406 may be performed on the historical campaign data periodically, as additional historical campaign data becomes available, or at any other desired time or interval.

Using process 400, the predicted price per action of a planned advertising campaign may be determined based on its similarity to previously performed advertising campaigns. This advantageously allows advertising agencies and brands to predict how much money should be budgeted for marketing to obtain a desired result. Similarly, the predicted price may be used to determine if a brand is overpaying for a particular advertising campaign and can allow the brand to reallocate advertising funds to a campaign that provides a greater return on its investment.

3. Pricing Logic to Compare Prices of Social Media Actions

Figure 5:
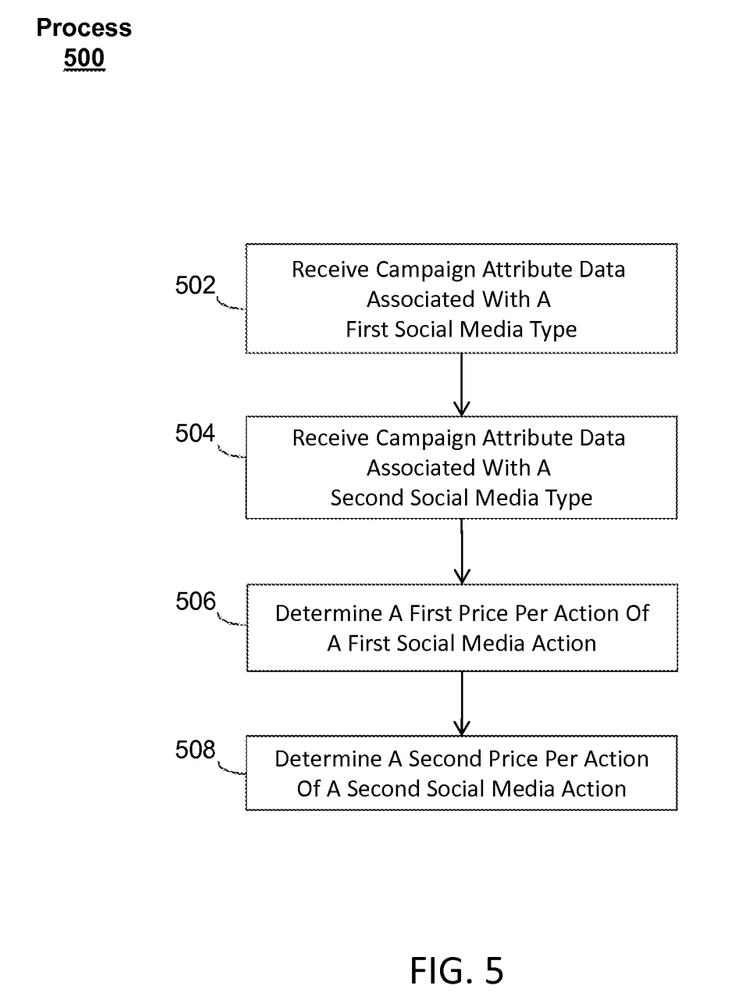
FIG. 5 depicts an exemplary process for comparing prices of social media actions from disparate social media types.

FIG. 5 illustrates an exemplary process 500 that can be performed by pricing server 110 using pricing logic 112 to compare social media actions from disparate social media services. At block 502, campaign attribute data associated with a first social media type (e.g., Facebook™, Twitter™, Linkedin™, YouTube™, Pinterest™, etc.) may be received. The first social media type may include a first type of social media action (e.g., comments, "likes," "Tweets," shares, follows, etc.), which may be identified by the campaign attribute data. The types of attribute data received may be similar or identical to that received at block 402 of process 400. The campaign attribute data may also be received from a user of the pricing service offered by pricing server 110, may be determined by pricing server 110, or may be received from a social media provider, such as social media provider 102, 104, or 106 and/or third party, such as third party 120 in a similar manner as described above with respect to block 402 of process 400.

At block 504, campaign attribute data associated with a second social media type (e.g., Facebook™, Twitter™, Linkedin™, YouTube™, Pinterest™, etc.) that is different than the first social media type may be received. The second social media type may include a second type of social media action (e.g., comments, "likes," "Tweets," shares, follows, etc.) that is different than the first type of social media action and which may be identified by the campaign attribute data. For example, the first social media type may include Facebook™ and the first type of social media action may include a "like," while the second social media type may include Twitter™ and the second type of social media action may include a "Tweet." The types of attribute data received may be similar or identical to that received at block 402 of process 400. The campaign attribute data may also be received from a user of the pricing service offered by pricing server 110, may be determined by pricing server 110, or may be received from a social media provider, such as social media provider 102, 104, or 106 and/or third party, such as third party 120 in a similar manner as described above with respect to block 402 of process 400.

At block 506, a first price per action may be determined for the first type of social media action. In some examples, server 110 using pricing logic 112 may use a process similar or identical to process 400 to determine the price per action, where the current campaign attribute data received at block 402 may include the campaign attribute data received at block 502. The determined price may be expressed in terms of dollars, another type of currency, or a generic unit of measurement.

At block 508, a second price per action may be determined for the second type of social media action. In some examples, server 110 using pricing logic 112 may use a process similar or identical to process 400 to determine the price per action, where the current campaign attribute data received at block 402 may include the campaign attribute data received at block 502. The price may be expressed in the same unit of measurement as used for the first cost per action determined at block 506. In this way, social media actions from disparate social media types may be compared to analyze their relative worth to a brand. This can be useful in determining the best allocation of resources for an advertising campaign.

While blocks 502, 504, 506, and 508 are shown in a particular order in FIG. 5, it should be appreciated that these blocks may be performed in any order and some blocks may be performed at the same time.

4. Computer System

Figure 6:
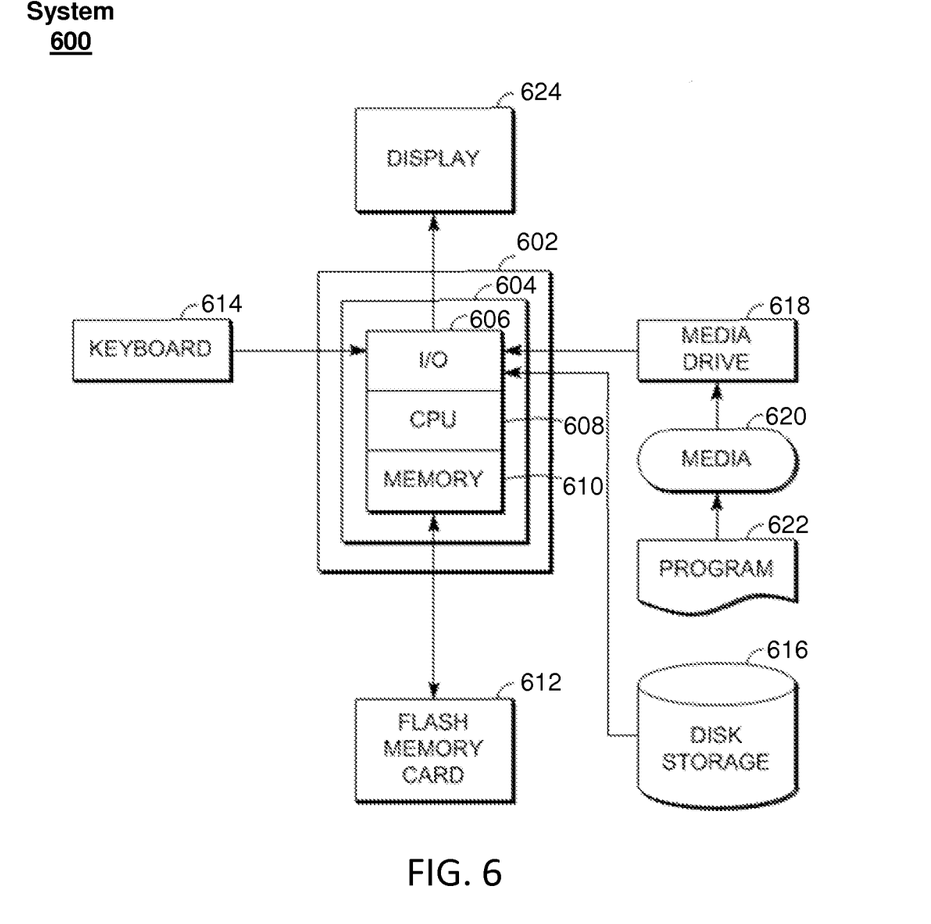
FIG. 6 depicts an exemplary computing system that may be used to perform the exemplary processes according to various embodiments.

FIG. 6 depicts an exemplary computing system 600 configured to perform any one of the above-described processes. Computing system 600 may be included within or coupled to server 110 of system 100 and may be used to execute logic pricing logic 112 to perform processes 400 and 500. In this context, computing system 600 may include, for example, a processor, memory, storage, and I/O devices (e.g., monitor, keyboard, disk drive, Internet connection, etc.). However, computing system 600 may include circuitry or other specialized hardware for carrying out some or all aspects of the processes. In some operational settings, computing system 600 may be configured as a system that includes one or more units, each of which is configured to carry out some aspects of the processes either in software, hardware, or some combination thereof.

FIG. 6 depicts computing system 600 with a number of components that may be used to perform the above-described processes. The main system 602 includes a motherboard 604 having an I/O section 606, one or more central processing units (CPU) 608, and a memory section 610, which may have a flash memory card 612 related to it. The I/O section 606 is connected to a display 624, a keyboard 614, a disk storage unit 616, and a media drive unit 618. The media drive unit 618 can read/write a computer-readable medium 620, which can contain programs 622 and/or data.

At least some values based on the results of the above-described processes can be saved for subsequent use. Additionally, a non-transitory computer-readable storage medium can be used to store (e.g., tangibly embody) one or more computer programs for performing any one of the above-described processes by means of a computer. The computer program may be written, for example, in a general-purpose programming language (e.g., Pascal, C, C++, Java) or some specialized application-specific language.

Although only certain exemplary embodiments have been described in detail above, those skilled in the art will readily appreciate that many modifications are possible in the exemplary embodiments without materially departing from the novel teachings and advantages of this disclosure. For example, aspects of embodiments disclosed above can be combined in other combinations to form additional embodiments. Accordingly, all such modifications are intended to be included within the scope of this technology.

What is claimed is:

1. A computer-implemented method for determining a price per action in a social media service, the method comprising:
   receiving, at a pricing server, campaign attribute data associated with a first advertising campaign on a first social media service;
   generating, by the pricing server, a first plurality of price predictions for a first social media action of the first social media service based on the campaign attribute data associated with the first advertising campaign and historical campaign data associated with a plurality of historical advertising campaigns, wherein generating the first plurality of price predictions for the first social media action of the first social media service comprises:
      generating a first price prediction for the first social media action by identifying a first matching historical advertising campaign of the plurality of historical advertising campaigns using a k-Nearest Neighbor algorithm;
      generating a second price prediction for the first social media action by identifying a second matching historical advertising campaign of the plurality of historical advertising campaigns using a Random Forest algorithm; and
      generating a third price prediction for the first social media action by:
         identifying a linear relationship between an attribute of the historical advertising campaigns and a price of the first social media action using a Multivariate Adaptive Regression Splines algorithm; and
         determining the third price prediction based on a value of the attribute of the first advertising campaign and the identified linear relationship;
   generating, by the pricing server, a first final price prediction for the first social media action based on the first plurality of price predictions; and
   transmitting, by the pricing server, the first final price prediction.

2. The method of claim 1, wherein the method further comprises receiving, by the pricing server, the historical campaign data associated with the plurality of historical advertising campaigns, wherein the historical campaign data comprises a plurality of price per actions and a plurality of sets of campaign attribute data associated with the plurality of historical advertising campaigns.

3. The method of claim 1, further comprising:
   performing, by the pricing server, a first set of mathematical transformations on the campaign attribute data associated with the first advertising campaign; and
   performing, by the pricing server, a second set of mathematical transformations on the historical campaign data associated with the plurality of historical advertising campaigns.

4. The method of claim 1, wherein:
   the first price prediction comprises a price of a social media action in the first matching historical advertising campaign;
   the second price prediction comprises a price of a social media action in the second matching historical advertising campaign; and
   the third price prediction comprises a price calculated from the identified linear relationship and the value of the attribute of the first advertising campaign.

5. The method of claim 1, wherein generating the first final price prediction for the first social media action based on the first plurality of price predictions comprises:
   assigning a first weight to the first price prediction;
   assigning a second weight to the second price prediction;
   assigning a third weight to the third price prediction; and
   generating the final price prediction by calculating a weighted sum of the first plurality of price predictions using the first weight, the first price prediction, the second weight, the second price prediction, the third weight, and the third price prediction.

6. The method of claim 5, wherein the first weight, the second weight, and the third weight are generated using a root-mean square error algorithm.

7. The method of claim 1, wherein the campaign attribute data associated with the first advertising campaign is received from a user requesting the first final predicted price, the first social media service, or a third party aggregator of advertising data.

8. The method of claim 1, further comprising:
   receiving, at the pricing server, campaign attribute data associated with a second advertising campaign on a second social media service, wherein the first social media service and the second social media service are different;
   generating, by the pricing server, a second plurality of price predictions for a second social media action of the second social media service, wherein the first social media action and the second social media action are different;
   generating, by the pricing server, a second final price prediction for the second social media action based on the second plurality of price predictions; and
   transmitting, by the pricing server, the second final price prediction.

9. A system for determining a price per action in a social media service, the system comprising:
   a pricing server configured to:
      receive campaign attribute data associated with a first advertising campaign on a first social media service;
      generate a first plurality of price predictions for a first social media action of the first social media service based on the campaign attribute data associated with the first advertising campaign and historical campaign data associated with a plurality of historical advertising campaigns, wherein generating the first plurality of price predictions for the first social media action of the first social media service comprises:
         generating a first price prediction for the first social media action by identifying a first matching historical advertising campaign of the plurality of historical advertising campaigns using a k-Nearest Neighbor algorithm;
         generating a second price prediction for the first social media action by identifying a second matching historical advertising campaign of the plurality of historical advertising campaigns using a Random Forest algorithm; and generating a third price prediction for the first social media action by:
  identifying a linear relationship between an attribute of the historical advertising campaigns and a price of the first social media action using a Multivariate Adaptive Regression Splines algorithm; and
  determining the third price prediction based on a value of the attribute of the first advertising campaign and the identified linear relationship;
generate a first final price prediction for the first social media action based on the first plurality of price predictions; and
transmit the first final price prediction.

10. The system of claim 9, wherein the pricing server is further configured to receive the historical campaign data associated with the plurality of historical advertising campaigns, wherein the historical campaign data comprises a plurality of price per actions and a plurality of sets of campaign attribute data associated with the plurality of historical advertising campaigns.

11. The system of claim 9, wherein the pricing server is further configured to:
perform a first set of mathematical transformations on the campaign attribute data associated with the first advertising campaign; and
perform a second set of mathematical transformations on the historical campaign data associated with the plurality of historical advertising campaigns.

12. The system of claim 9, wherein the pricing server is further configured to:
receive campaign attribute data associated with a second advertising campaign on a second social media service, wherein the first social media service and the second social media service are different;
generate a second plurality of price predictions for a second social media action of the second social media service, wherein the first social media action and the second social media action are different;
generate a second final price prediction for the second social media action based on the second plurality of price predictions; and
transmit the second final price prediction.

13. A non-transitory computer-readable storage medium having computer-executable instructions for determining a price per action in a social media service, the instructions for:
receiving, at a pricing server, campaign attribute data associated with a first advertising campaign on a first social media service;
generating, by the pricing server, a first plurality of price predictions for a first social media action of the first social media service based on the campaign attribute data associated with the first advertising campaign and historical campaign data associated with a plurality of historical advertising campaigns, wherein generating the first plurality of price predictions for the first social media action of the first social media service comprises:
  generating a first price prediction for the first social media action by identifying a first matching historical advertising campaign of the plurality of historical advertising campaigns using a k-Nearest Neighbor algorithm;
  generating a second price prediction for the first social media action by identifying a second matching historical advertising campaign of the plurality of historical advertising campaigns using a Random Forest algorithm; and
  generating a third price prediction for the first social media action by:
    identifying a linear relationship between an attribute of the historical advertising campaigns and a price of the first social media action using a Multivariate Adaptive Regression Splines algorithm; and
    determining the third price prediction based on a value of the attribute of the first advertising campaign and the identified linear relationship;
generating, by the pricing server, a first final price prediction for the first social media action based on the first plurality of price predictions; and
transmitting, by the pricing server, the first final price prediction.

14. The non-transitory computer-readable storage medium of claim 13, further comprising instructions for receiving, by the pricing server, the historical campaign data associated with the plurality of historical advertising campaigns, wherein the historical campaign data comprises a plurality of price per actions and a plurality of sets of campaign attribute data associated with the plurality of historical advertising campaigns.

15. The non-transitory computer-readable storage medium of claim 13, further comprising instructions for:
performing, by the pricing server, a first set of mathematical transformations on the campaign attribute data associated with the first advertising campaign; and
performing, by pricing server, a second set of mathematical transformations on the historical campaign data associated with the plurality of historical advertising campaigns.

16. The non-transitory computer-readable storage medium of claim 13, wherein generating the first final price prediction for the first social media action based on the first plurality of price predictions comprises:
assigning a first weight to the first price prediction;
assigning a second weight to the second price prediction;
assigning a third weight to the third price prediction; and
generating the final price prediction by calculating a weighted sum of the first plurality of price predictions using the first weight, the first price prediction, the second weight, the second price prediction, the third weight, and the third price prediction.

17. The non-transitory computer-readable storage medium of claim 13, further comprising instructions for:
receiving, at the pricing server, campaign attribute data associated with a second advertising campaign on a second social media service, wherein the first social media service and the second social media service are different;
generating, by the pricing server, a second plurality of price predictions for a second social media action of the second social media service, wherein the first social media action and the second social media action are different;
generating, by the pricing server, a second final price prediction for the second social media action based on the second plurality of price predictions; and
transmitting, by the pricing server, the second final price prediction.

* * * * *